United States Patent [19]

Hoermandinger

[11] Patent Number: 4,909,642
[45] Date of Patent: Mar. 20, 1990

[54] SHIFTABLE ELASTIC SUPPORT BEARING FOR VIBRATION DAMPERS FOR VEHICLES

[75] Inventor: Klaus Hoermandinger, Weissach-Flacht, Fed. Rep. of Germany

[73] Assignee: Dr. Ing. h.c.F. Porsche AG, Fed. Rep. of Germany.

[21] Appl. No.: 306,158

[22] Filed: Feb. 6, 1989

[30] Foreign Application Priority Data

Feb. 4, 1988 [DE] Fed. Rep. of Germany ....... 3803289

[51] Int. Cl.[4] ...................... B62D 17/00; F16C 27/00
[52] U.S. Cl. .................................... 384/536; 280/668; 384/519
[58] Field of Search ............... 384/447, 535, 536, 519, 384/609, 616, 620; 280/668, 661

[56] References Cited

U.S. PATENT DOCUMENTS

| | | | |
|---|---|---|---|
| 2,691,553 | 10/1954 | Pettigrew | 384/447 |
| 2,826,462 | 3/1958 | Evans | 384/519 |
| 4,200,307 | 4/1980 | Szabó | 280/668 |
| 4,213,631 | 7/1980 | Wilkerson | 280/661 |
| 4,372,575 | 2/1983 | Hyma | 280/661 |
| 4,690,425 | 9/1987 | Kubo | 280/668 |
| 4,817,984 | 4/1989 | Ferman et al. | 280/668 |

Primary Examiner—Thomas R. Hannon
Attorney, Agent, or Firm—Barnes & Thornburg

[57] ABSTRACT

A shiftable elastic support bearing is described for a vibration damper, which is sloped in transverse and longitudinal direction of the vehicle. This support bearing is used in vehicles with different wheel track widths. It has an outer bearing flange which is arranged in an oblique plane, supports itself at the vehicle body and is held by fastening devices. It comprises a receiving element having an inserted ball bearing, this receiving element being connected by an elastic element. The vibration damper can be fixed by the bearing flange in two spaced positions in bearing receiving devices of the body of vehicles. In the bearing receiving device, the bearing flange with the damper is arranged so that it can be rotated around its center line by an angle of approximately 180°. By means of a ball bearing, which can be shifted in height in the receiving element, the damper, in both positions, is arranged at the same height with respect to the bearing receiving device.

12 Claims, 4 Drawing Sheets

SHIFTABLE ELASTIC SUPPORT BEARING FOR VIBRATION DAMPERS FOR VEHICLES

BACKGROUND AND SUMMARY OF THE INVENTION

The invention relates to a shiftable elastic support bearing for vibration dampers for use in vehicles of different track widths.

From U.S. Pat. No. 4,213,631, a McPherson strut is known, which is held between a wheel suspension member and a bearing receiving device on the body side. By means of the spring strut, which can be adjusted in the bearing receiving device by means of connecting elements, the position of the wheel, such as the camber and the caster, can be changed.

It is an object of the invention to provide a support bearing for a vibration damper, which is arranged in a sloped position, can be used for vehicles with different wheel track widths, and can be installed in the vehicles in a simple manner, without the necessity of subsequently changing the geometrical data, such as the inclination, the camber, the toe-in, the spring travel, as well as the kinematic data, such as the bump camber change, the bump toe-in, the caster change.

According to the invention, this object is achieved by providing an arrangement wherein (a) the vibration damper, can be fixed in two spaced positions (A, B) in bearing receiving devices of the body of a vehicle by means of the bearing flange;

(b) the bearing flange with the damper is arranged in the bearing receiving device, so that it can be rotated by an angle of approximately 180° around its center line; and (c) the damper is arranged at the same height with respect to the bearing receiving device in both positions (A, B), by means of a ball bearing which can be shifted in height in the receiving element.

Principal advantages achieved by means of the invention result from using a shiftable unit consisting of the support bearing and the vibration damper for two wheel track widths of vehicles. This shifting takes place by simply rotating the support bearing by 180° in an opening of the bearing receiving device on the body side, such as a spring strut dome. The characteristics of the bearing may differ.

Since the bearing receiving device extends obliquely sloped toward the outside at the level of the vehicle, during the shifting, a shifting of the height takes place at the same time in the receiving device of the vibration damper, which results in an undesirable reduction of the damper travel and in changed wheel alignment values.

In order to avoid these disadvantages and, for example, in the case of a broad wheel track width, create the same conditions at the wheel damper or at the vibration damper, as in the case of a smaller wheel track width, a height compensation element is arranged in the support bearing. This height compensation element comprises a spacer which can be inserted into the interior receiving element of the bearing in a manner which is simple as far as the mounting process is concerned. This results in the same position of the vibration damper, in each case, for both wheel tracks widths, with respect to the bearing receiving device on the body side, and thus no reduction occurs of the damper travel. In addition, by means of this measure of compensating the height, an unchanged position of the wheel adjusting values is maintained, such as the camber, the toe-in, the toe-out, the inclination, the caster, and additional adjustments or readjustments may be largely avoided.

Other objects, advantages and novel features of the present invention will become apparent from the following detailed description of the invention when considered in conjunction with the accompanying drawings.

BRIEF DESCRIPTION OF THE DRAWINGS

FIG. 1a is a schematic representation, as a top view, depicting widening and reducing the wheel track width utilizing the support bearing arrangement of FIG. 1;

DETAILED DESCRIPTION OF THE DRAWING

Figure 1:
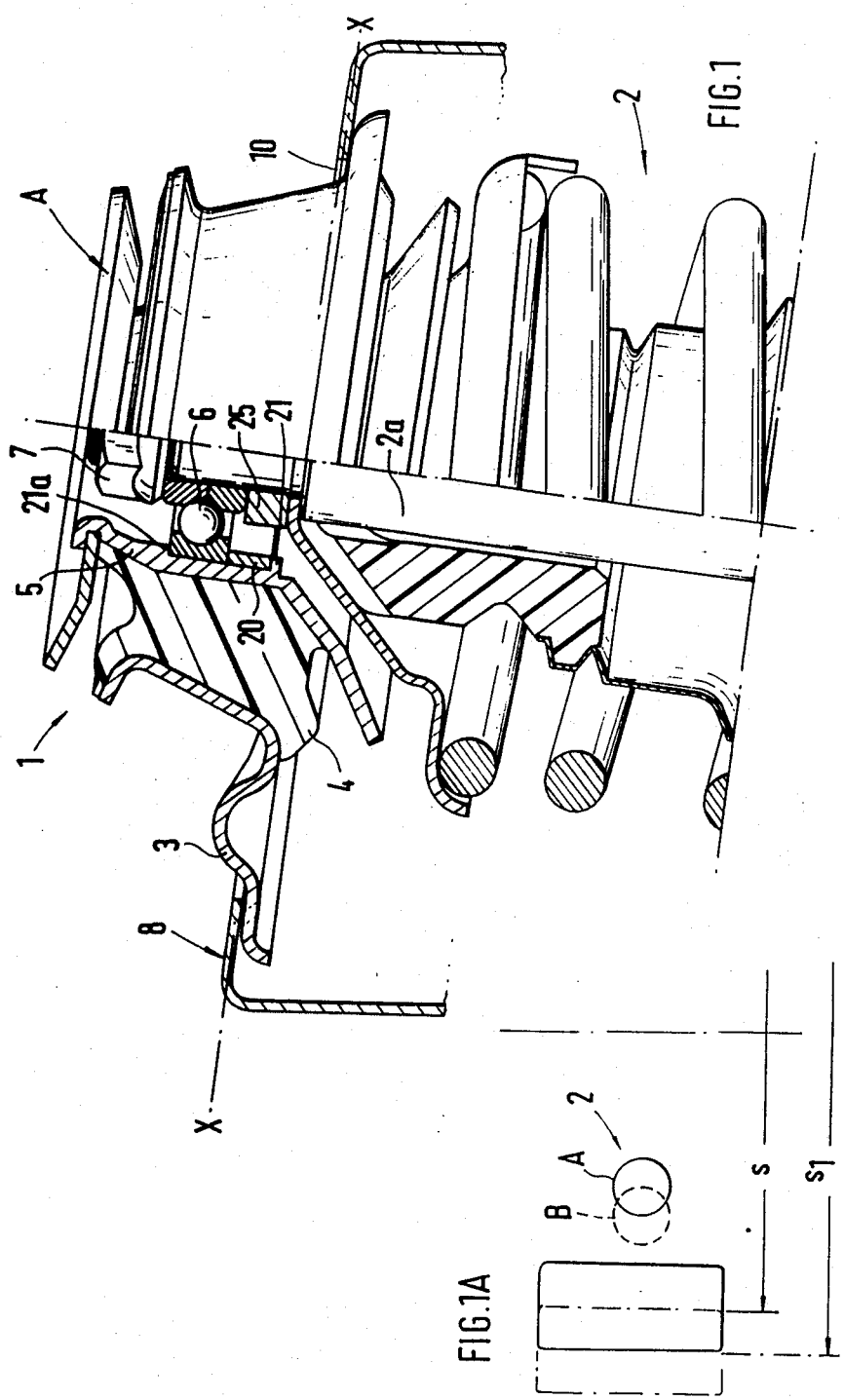
FIG. 1 is a front view of a support bearing, which is on the left—with respect to the driving direction—and has a vibration damper, in the installed position in the assembled condition, constructed in accordance with a preferred embodiment of the invention.

The support bearing 1 for a vibration damper 2 comprises essentially an outer bearing flange 3, with which a receiving element 5 is connected by means of an elastic element 4. In the cylindrical part of this element 5, a ball bearing 6 is contained, which can be shifted to be higher via a spacer 20, a piston rod 2a of the damper 2 being disposed in this ball bearing 6 and being fixed by means of a nut 7.

The damper 2 is arranged eccentrically with respect to the bearing flange 3, which, on the body side of the vehicle, is supported in a bearing receiving device 8, which is arranged in an oblique plane X—X which rises toward the outside in transverse direction of the vehicle. In the bearing receiving device 8, an oblong opening 10 is provided which extends in transverse direction of the vehicle and in which the support bearing 1 is arranged, partially projecting through in upward direction, and by means of screws 9, is connected with the bearing flange 3. Preferably, the screws 9 are arranged in bores 19 adjacent to longitudinal sides 11, 12 of the opening 10.

Figure 2:
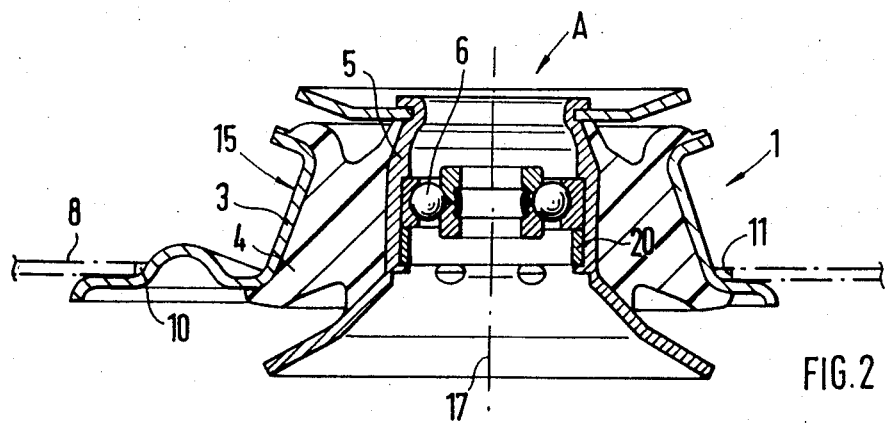
FIG. 2 is a sectional representation of the support bearing of FIG. 1 positioned for a small track width.
Figure 3:
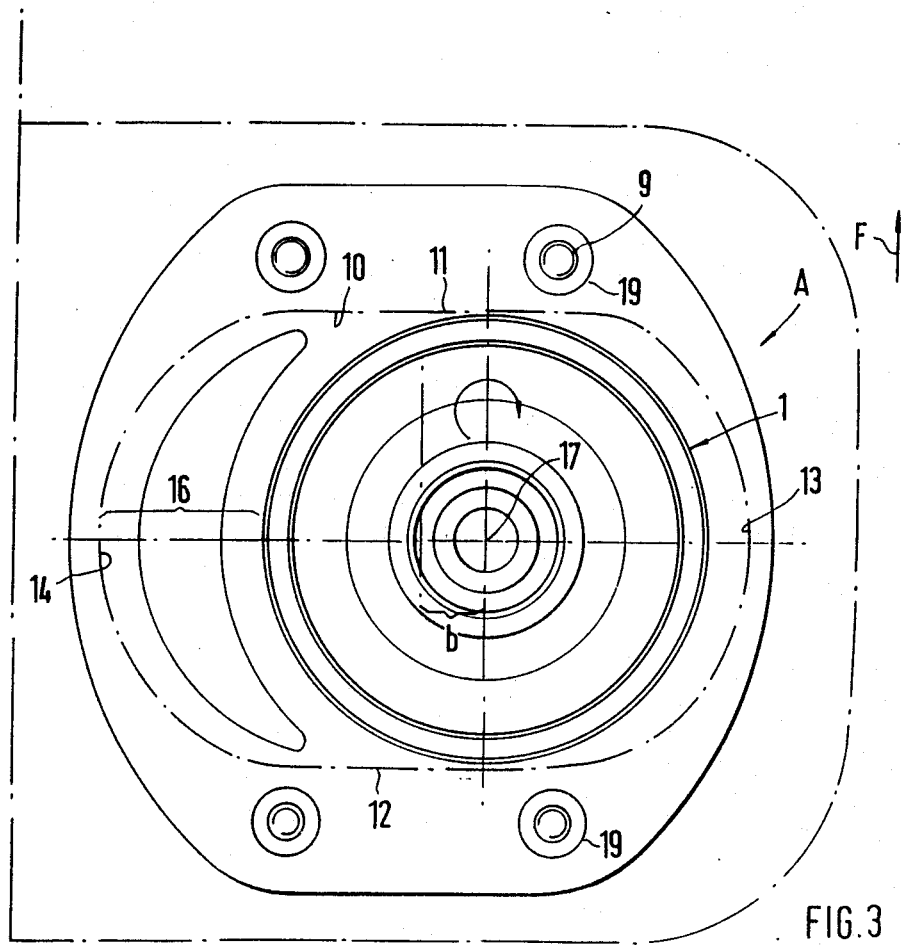
FIG. 3 is a top view of FIG. 2 of the bearing support having a bearing flange on the body side which is outlined by means of dash-dotted lines.

FIGS. 2 and 3 show the arrangement of a support bearing 1 which—with respect to the driving direction F—is on the left, without any damper, in a first position A for a small track width s, as shown schematically in FIG. 1a. In this case, the bearing flange 3, inside the opening 10, is moved close to the interior edge 13, a clearance 16 remaining between the opposite outer edge 14 and the pipe-shaped part 15 of the flange 3.

Figure 4:
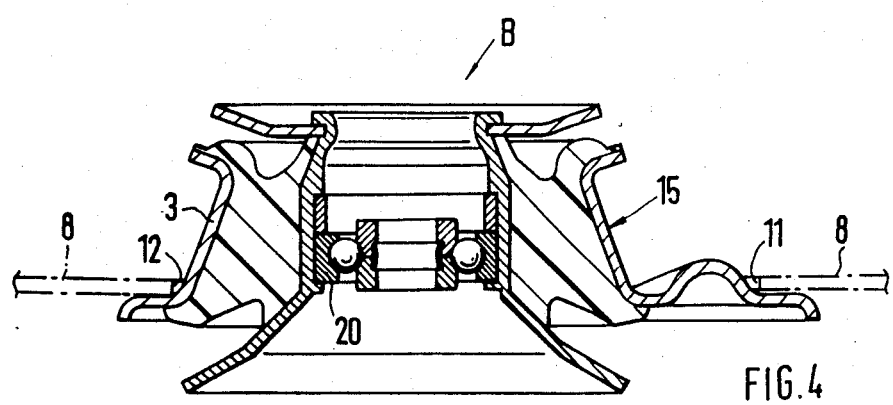
FIG. 4 is a sectional representation of the support bearing of FIGS. 1-3 positioned for a large wheel track width.
Figure 5:
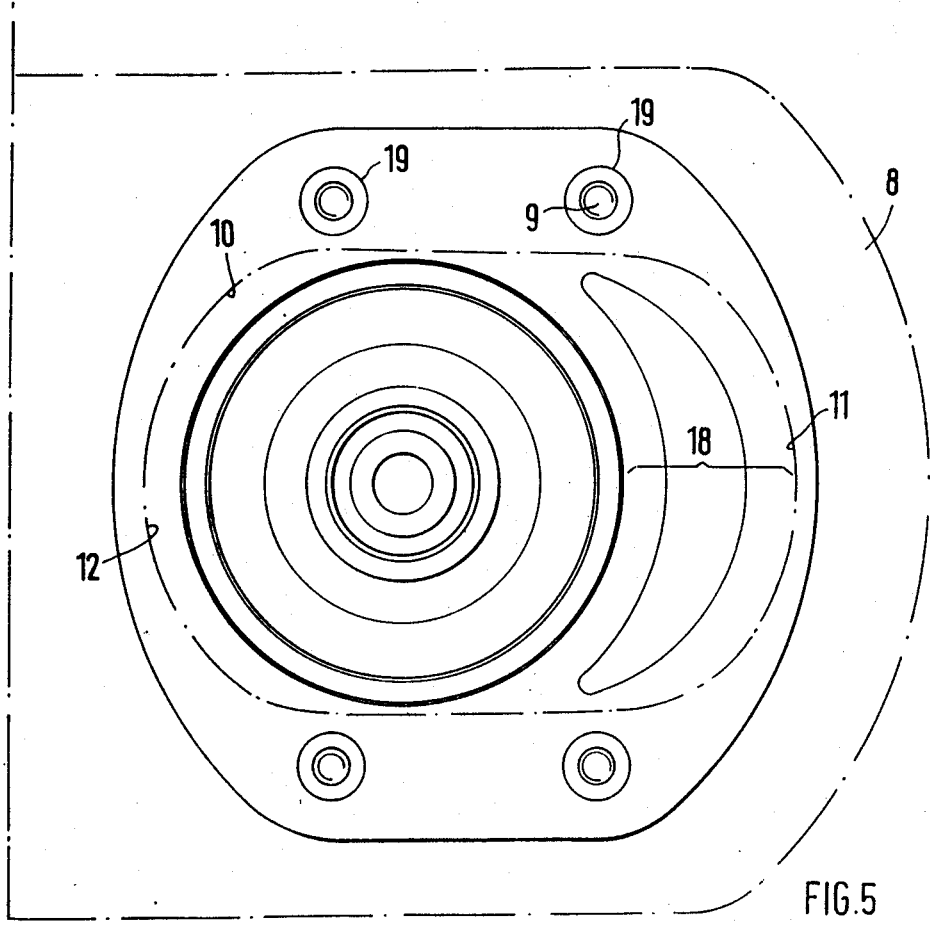
FIG. 5 is a top view of FIG. 4 onto the support bearing having a bearing flange on the body side which is outlined by dash-dotted lines.

When the support bearing 1 is used in a vehicle for a second position B with a larger track width $s_1$, as shown in FIG. 1a, the bearing flange 3 is rotated by 180° around its center line, as shown by the arrow. The position of the support bearing 1 after the rotation is shown in FIGS. 4 and 5. The flange 3 has now moved to the outer edge 12, a clearance 18 remaining between the interior edge 11 and the pipe-shaped part 15. By means of the rotation of the support bearing 1 in the opening 10 of the bearing receiving device 8, when the same bores 19 are used in the bearing receiving device 8 as well as in the bearing flange 3, a displacement of the vibration damper 2 takes place corresponding to the desired broadening or reduction of the wheel track width, as shown schematically in FIG. 1. The extent of the change of the track width is schematically shown in FIG. 3.

Figure 6:
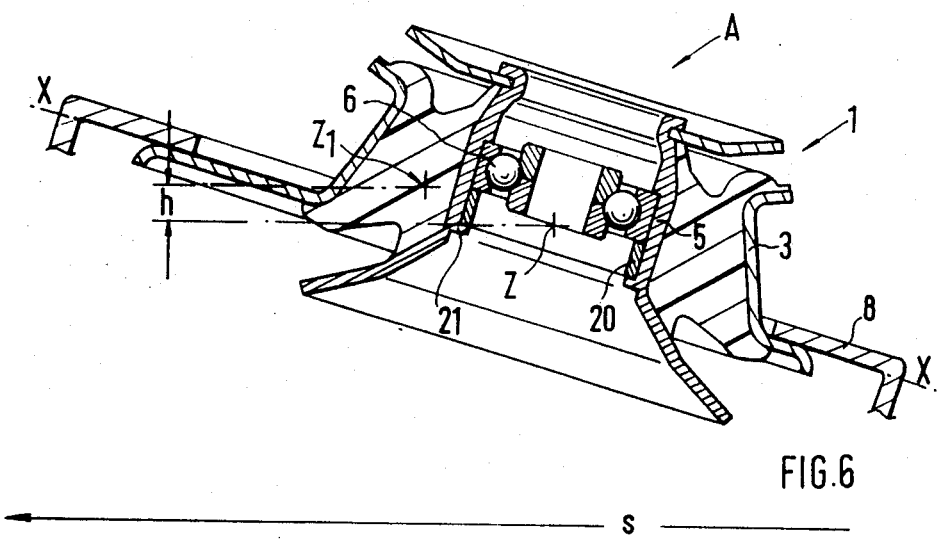
FIG. 6 is a schematic representation of the support bearing of FIG. 5 for a small track width, where the shifting of the height of the vibration damper is outlined, in the case of a broadening of the wheel track width.
Figure 7:
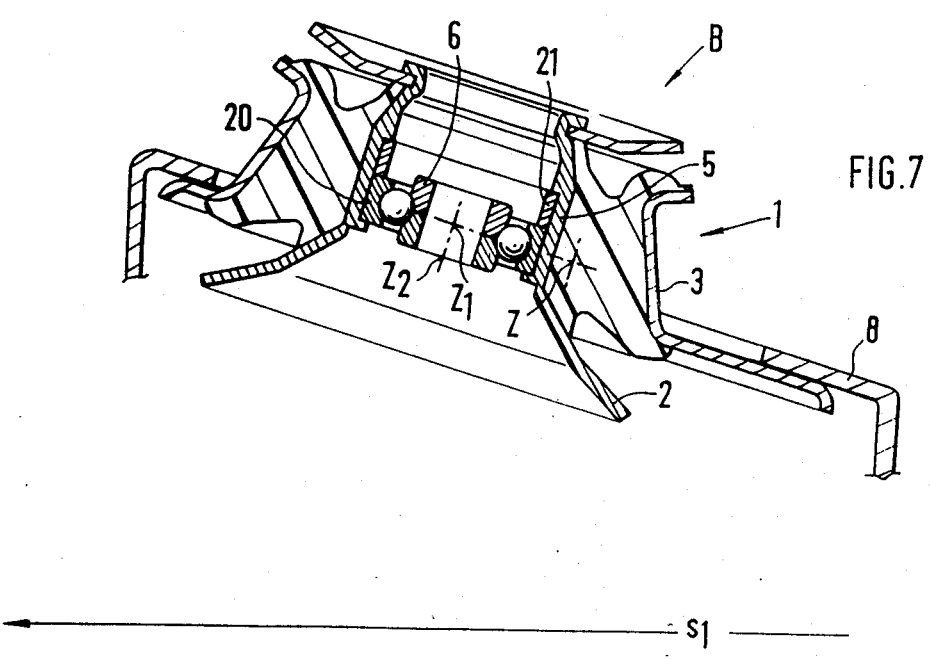
FIG. 7 is a schematic representation of the support bearing of FIGS. 1-5 for a broad track with an outlined shifting of the height by means of a broadening of the wheel track width.

FIGS. 6 and 7 show schematically how a bearing point Z of the piston rod 2a of the vibration damper 2 at the ball bearing 6 changes, by means of a change of the track width from s to $s_1$ or from $s_1$ to s, because of the shifting of the bearing 1 by an angle of 180° on the oblique level X—X. FIG. 6 shows the support bearing 1 in Position A for a small wheel track width s. When the bearing 1 with the bearing flange 3 is rotated into Position B (FIG. 7) with the wheel track width $s_1$ (FIG. 1a), the bearing point Z will shift in height by the amount h and take up position $Z_1$.

As a result, the kinematics of the wheel suspension are affected disadvantageously and the damper travel is reduced. In order to avoid this, for all track widths s and $s_1$, a bearing point Z for the piston rod 2a of the vibration damper 2 is required, whose height remains the same. For this purpose, the ball bearing 6 is held in the pipe-shaped part of the receiving element 5 by means of the spacer 20. As shown in FIG. 6, in Position A (track width s), this spacer 20 is arranged below the ball bearing 6 and is supported by means of projections 21, which are formed by deformation or the like in the receiving element 5. For Position B (wheel track width $s_1$), the spacer 20 is arranged above the ball bearing and is supported by additional projections 21a. The piston rod 2a of the vibration damper 2, by means of a compensating element 25, is held directly at the ball bearing 6, causing the bearing point Z to be at the same height as the bearing point $Z_2$, as shown in FIG. 7.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A shiftable elastic support bearing for a vibration damper sloped in transverse and longitudinal direction of a vehicle, for use in vehicles with different wheel track widths, having an outer bearing flange which is arranged in an oblique plane and which is supported at the vehicle body and held by means of fastening devices and which comprises a receiving element having an inserted ball bearing, this receiving element being connected by means of an elastic element, wherein
   (a) the vibration damper can be fixed in one of two spaced positions (A, B) in bearing receiving devices of the body of a vehicle by means of the bearing flange,
   (b) the bearing flange with the damper is arranged in the bearing receiving device so that it can be rotated by an angle of approximately 180° around its center line, and
   (c) the damper, is arranged at the same height with respect to the bearing receiving device in both positions (A, B), by means of a ball bearing which can be shifted in height in the receiving element.

2. A support bearing according to claim 1, wherein the vibration damper, is arranged eccentrically with respect to the bearing flange by means of the receiving element.

3. A support bearing according to claim 2, wherein the bearing receiving device on the body side has an oblong opening, which is constructed for both positions (A, B) of the vibration damper and extends in transverse direction of the vehicle and has clearances with respect to the receiving element, and at both longitudinal sides of the opening, bores are provided, which correspond to bores in the bearing flange.

4. A support bearing according to claim 2, wherein the ball bearing is held vertically adjustably in the receiving element by means of a spacer, and wherein the ball bearing is supported between projections of a pipe-shaped section of the receiving element by means of the spacer.

5. A support bearing according to claim 1, wherein the bearing receiving device on the body side has an oblong opening, which is constructed for both positions (A, B) of the vibration damper and extends in transverse direction of the vehicle and has clearances with respect to the receiving element, and at both longitudinal sides of the opening, bores are provided, which correspond to bores in the bearing flange.

6. A support bearing according to claim 5, wherein the ball bearing is held vertically adjustably in the receiving element by means of a spacer, and wherein the ball bearing is supported between projections of a pipe-shaped section of the receiving element by means of the spacer.

7. A support bearing according to claim 6, wherein the spacer is arranged vertically below the ball bearing and the bearing point (Z) of a piston rod of the vibration damper when the bearing is in position (A) of the vibration damper for a narrow wheel track width (s).

8. A support bearing according to claim 7, wherein the spacer is arranged vertically above the ball bearing and the bearing point ($Z_2$) of the piston is arranged directly at the ball bearing when the bearing is Position (B) of the vibration damper for another wider wheel track width ($s_1$).

9. A support bearing according to claim 6, wherein the spacer is arranged vertically above the ball bearing and the bearing point ($Z_2$) of a piston rod is arranged directly at the ball bearing when the bearing is in Position (B) of the vibration damper for another wider wheel track width ($s_1$).

10. A support bearing according to claim 1, wherein the ball bearing is held vertically adjustably in the receiving element by means of a spacer, and wherein the ball bearing is supported between projections of a pipe-shaped section of the receiving element by means of the spacer.

11. A support bearing according to claim 10, wherein the spacer is arranged vertically below the ball bearing and the bearing point (Z) of a piston rod of the vibration damper when the bearing is in position (A) of the vibration damper for a narrow wheel track width (s).

12. A support bearing according to claim 10, wherein the spacer is arranged vertically above the ball bearing and the bearing point ($Z_2$) of a piston rod is arranged directly at the ball bearing when the bearing is in Position (B) of the vibration damper for another wider wheel track width ($s_1$).

* * * * *